United States Patent [19]

Okamoto et al.

[11] 4,364,241

[45] Dec. 21, 1982

[54] DEVICE FOR DRAINING COOLING LIQUID FROM ROTARY ELECTRIC MACHINE WITH LIQUID COOLED ROTOR

[75] Inventors: Kouichi Okamoto, Kobe; Masaki Sakuyama, Ashiya; Kenji Kataoka, Kobe, all of Japan

[73] Assignee: Mitsubishi Denki Kabushiki Kaisha, Tokyo, Japan

[21] Appl. No.: 212,162

[22] Filed: Dec. 2, 1980

[51] Int. Cl.³ .............................................. F25B 31/00
[52] U.S. Cl. .......................................... 62/505; 277/3; 277/59; 310/54; 310/61
[58] Field of Search ....................... 62/505, 55; 310/54, 310/61; 277/3, 59

[56] References Cited

U.S. PATENT DOCUMENTS

| | | | |
|---|---|---|---|
| 3,733,501 | 5/1973 | Heller et al. | 310/54 |
| 3,831,046 | 8/1974 | Curtis et al. | 310/54 |
| 3,835,919 | 9/1974 | Lambrecht et al. | 310/54 |
| 3,922,573 | 11/1975 | Pluschke | 310/54 |
| 4,114,058 | 9/1978 | Albaric | 310/54 |
| 4,114,059 | 9/1978 | Albaric et al. | 310/54 |

*Primary Examiner*—Ronald C. Capossela

*Attorney, Agent, or Firm*—Sughrue, Mion, Zinn, Macpeak & Seas

[57] ABSTRACT

A cooling liquid conducting out device having an outlet chamber which is partially filled with cooling liquid drained from the rotor of a rotary electric machine constructed such that the strength of collision of the cooling liquid with the inner walls of the outlet chamber is made small to prevent cavitation in the discharging section of a cooling liquid supplying and draining pipe. According to another aspect of the invention, the device is provided with a cooling liquid containing member which is disposed surrounding the discharging section of the supplying and draining pipe, which is maintained filled with the cooling liquid discharged through the discharging section, and which has discharging paths communicating with the outlet chamber. In addition to the discharging paths, conducting out passages for conducting the cooling liquid out of the containing member are provided to cause the cooling liquid thus passing through the conducting out paths to collide with the cooling liquid discharged through the discharging paths. Limiting members suchs are thread seals are provided in the discharging paths to reduce the amount of cooling liquid passing through the discharging paths.

15 Claims, 10 Drawing Figures

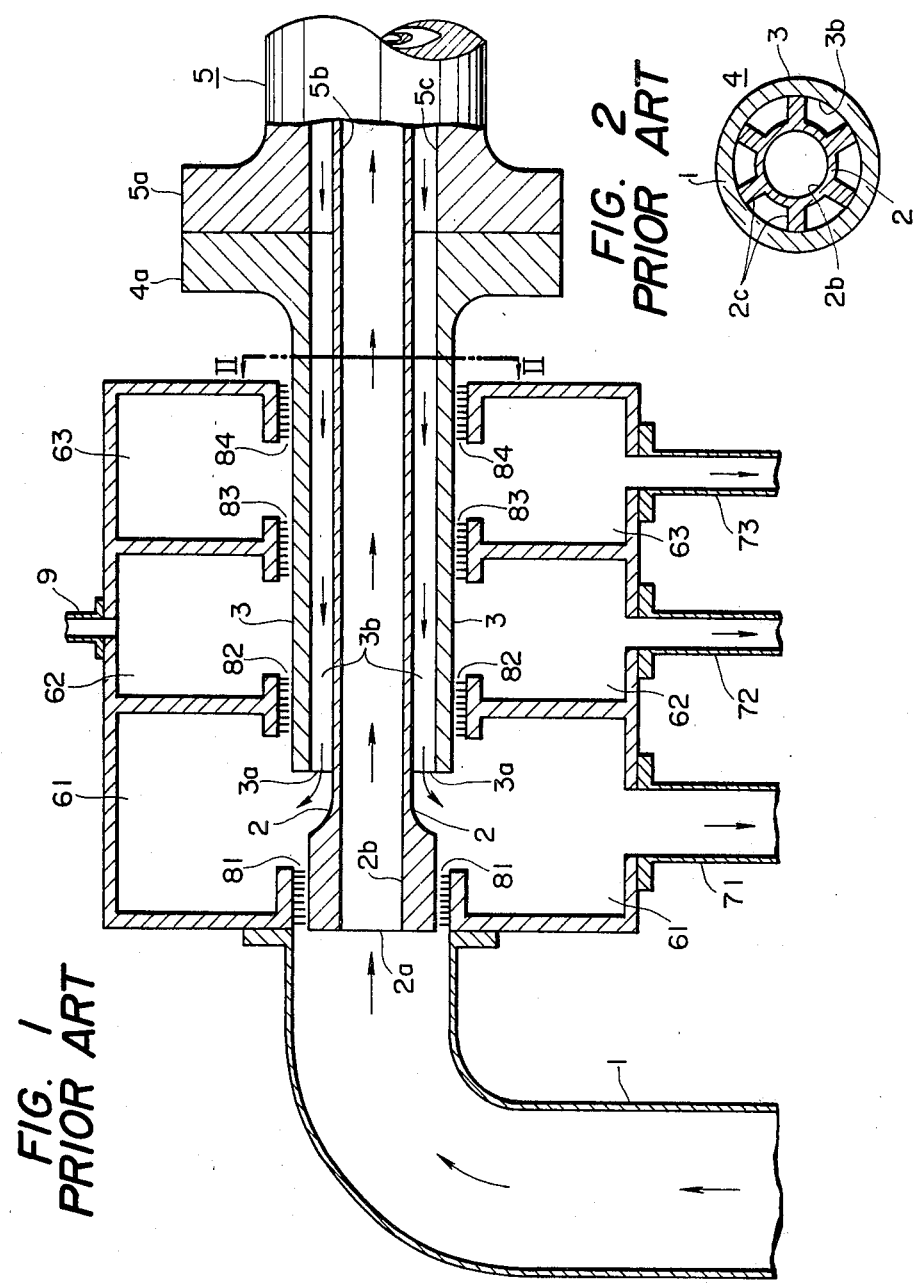

DEVICE FOR DRAINING COOLING LIQUID FROM ROTARY ELECTRIC MACHINE WITH LIQUID COOLED ROTOR

BACKGROUND OF THE INVENTION

The present invention relates to a liquid cooled rotor type rotary machine whose rotor is cooled by circulating a cooling liquid therein. More particularly, the invention relates to a device for conducting the cooling liquid out of the machine.

As is well known in the art, any increase of the capacity of a rotary electric machine depends on the ability to suppress increases in the temperature thereof, that is, how to effectively cool the machine. In other words, the maximum permissible capacity of a rotary electric machine is determined by its maximum temperature and hence its ability to dissipate heat. On the other hand, there have been strong demands for increased capacity of rotary electric machines including electric generators and especially turbine generators in order to improve the efficiency of power plants. For this purpose, a cooling technique of circulating hydrogen gas for cooling a turbine generator has been employed thus increasing the capacity thereof. However, this technique appears to have met its limit for increased capacity. Accordingly, it is necessary to provide another suitable cooling technique.

In order to meet this requirement, a technique has been proposed in which, instead of hydrogen gas, a cooling fluid such as water which is high in cooling efficiency is employed as the cooling medium. According to this technique, a cooling liquid is circulated in the stator to cool the latter. If this technique could be developed satisfactorily to cause the cooling liquid to circulate not only in the stator but also in the rotor, then the cooling effect would be greatly improved.

For instance, in the case of a turbine generator, its rotor rotates at a high speed of 3600 rpm. (60 Hz). Therefore, the forcing of the cooling liquid through the desired paths in high-speed rotating element is a problem the solution of which is considerably difficult. This difficult problem has retarded the commercialization of liquid cooled rotor type rotary electric machines.

FIG. 1 shows a device for directing the flow of cooling liquid in a liquid cooled rotor to which the technical concept of the invention is applicable. In FIG. 1, reference numeral 1 designates an inlet pipe through which a cooling liquid such as pure water is supplied with the aid of a supply pump (not shown), 2 a cylindrical liquid inflow pipe for receiving the cooling liquid from the inlet pipe 1 through an opening 2a with the hollow interior 2b forming the inflow path of the cooling liquid, and 3 a liquid outflow pipe placed over the inflow pipe 2 with a gap 3b providing a predetermined clearance therebetween. Pure water is preferred so as to not corrode any of the pipes with impurities. The gap 3b is utilized as the outflow path of the cooling liquid. The outflow pipe 3 has an opening 3a through which the cooling liquid is discharged. The outflow pipe 3 and the inflow pipe 2 are connected together to form a cooling liquid supplying and draining pipe 4 as shown in FIG. 2. As is apparent from FIG. 2, the inflow pipe 2 has a plurality of (six in the case of FIG. 2) protruding pieces 2c extending from the outer wall of the pipe 2. The protruding pieces 2c serves as spacers which couple the inflow pipe 2 and the outflow pipe 3 together and reinforce the pipes 2 and 3. The inflow pipe 2 with the protruding pieces 2c is made integral with the outflow pipe 3, for instance, by shrink fitting, to form the supplying and draining pipe 4. The pipe 4 has a flange 4a at its end which is coupled to the flange 5a of the shaft of the rotor of a rotary electric machine with bolts or the like (not shown). The rotor coil (not shown) is mounted on the shaft 5. As is clear from FIG. 1, an inflow path 5b and a outflow path 5c are formed in the rotor shaft 5 and are communicated with the inflow path 2b and the outflow path 3b in the supplying and draining pipe 4, respectively, so that the cooling liquid supplied through the inflow path 5b, after circulating in the rotor coil, is discharged into the outflow path 5c. In FIG. 1, the arrows indicate the flow of the cooling liquid. As described above, the cooling liquid, after cooling the rotor coil by circulating therein, is drained from the opening 3a of the outflow pipe 3 through the outflow paths 5c and 3b.

The device has a first outlet chamber 61 for receiving the liquid discharged from the opening 3a. The chamber 61 is so designed that it is always filled with the cooling liquid in order to prevent contamination of the cooling liquid (pure water) which might occur if the liquid were to be brought into contact with the atmosphere. The first outlet chamber 61 has a first outlet pipe 71 for conducting the cooling liquid out of the chamber 61. The cooling liquid discharged from the first outlet pipe 71 is not brought into contact with atmospheric air, that is, it is prevented from being contaminated, and therefore it can be resupplied to the inlet pipe 1 through a supply pump (not shown) after its temperature is decreased by a heat exchanger or the like (not shown). That is, the water can be recirculated.

In FIG. 1, reference numeral 81 designates a first labyrinth seal for preventing the leakage of cooling water from the inlet pipe 1 into the first outlet chamber 61. It is impossible to completely eliminate the leakage of liquid between a stationary part and a rotary part, but it is necessary to make maximum efforts to prevent the leakage of liquid. The liquid leaked into the chamber 61 will cause no serious difficulty because it is recirculated through the outlet pipe 71. However, it goes without saying that the amount of leaked liquid should be as small as possible because, if it is excessively large, the efficiency of the device is decreased.

A second labyrinth seal 82 is provided to prevent the leakage of liquid between the first outlet chamber 61 and the rotating pipe 4. A second outlet chamber 62 is provided for receiving the liquid which leaks through the second labyrinth seal 82 from the first outlet chamber 61. In the second outlet chamber 62, unlike the first outlet chamber 61, the cooling liquid is not fully filled therein and therefore the cooling liquid may be contaminated by contacting the air. In order to prevent this, a gas supplying pipe 9 is provided. Shielding gas such as nitrogen or hydrogen is supplied into the second outlet chamber 62 through the gas supplying pipe 9 at all times so that the pressure in the second outlet chamber 62 is maintained slightly higher than the ambient atmospheric pressure thereby preventing the entry of air into the second outlet chamber 62. Thus, the liquid leaked into the second outlet chamber 62 is not brought into contact with atmospheric air and accordingly is not contaminated. Therefore, the cooling liquid discharged from the second outlet pipe 72 of the chamber 62 can be recirculated through a heat exchanger and a supply pump (none of which are not shown) as in the case of the cooling liquid discharged from the first outlet chamber 61.

Further in FIG. 1, reference numeral 83 designates a third labyrinth seal for preventing the leakage of liquid between the second outlet chamber 62 and the rotating pipe 4, 63 a third outlet chamber for receiving the liquid which has passed through the third labyrinth seal from the second outlet chamber 62, and 73 a third outlet pipe communicating with the third outlet chamber 63. The amount of liquid leaking into the third outlet chamber is small because of the presence of the two seals 82 and 83 and therefore the third outlet chamber 63 is not shielded from the atmospheric air and accordingly the cooling liquid from the outlet pipe 73 is discarded without being recirculated. Of course, it may be applied to a retreatment device for water purification so that it can be used again.

The desired object can be substantially achieved with the above-described device. On the other hand, while the rotor shaft 5 is supported by bearings (not shown), the supplying and draining pipe 4 is supported in the form of an overhang, on the rotor shaft 5 because it is difficult to provide bearings for the pipe 4 due to the presence of the outlet chambers. Therefore, the device suffers from the difficulty that the axis of the pipe 4 may vibrate continuously. The lateral vibration of the pipe 4 is undesirable because it disturbs the sealing effect of the seals 81–84. The lateral vibration is increasingly likely to occur as the length of the supplying and draining pipe 4 increases. Thus, the shorter the pipe 4 the better the sealing effect. In the above-described device, three outlet chambers are provided and accordingly the pipe 4 must be long enough to cover all three chambers thereby making the undesirable lateral vibration quite high. Furthermore, the device is disadvantageous in that, since the outlet chamber 61 must be maintained filled with liquid, it is necessary to positively seal the casing of the outlet chamber 61. Moreover the power loss attributed to friction between the liquid and the pipe 4 is high.

These difficulties may be eliminated by the provision of a device as shown in FIG. 3. In FIG. 3, reference numeral 612 designates an outlet chamber which is formed by constructing the two outlet chambers 61 and 62 of FIG. 1 as a single unit and 712 designates an outlet pipe communicating with the outlet chamber 612. The remaining arrangement is the same as that of FIG. 1. Because the outlet chamber 612 is not fully filled with liquid, and in order to prevent the liquid in the chamber from being brought into contact with the air, a shielding gas such as nitrogen or hydrogen gas is supplied into the chamber 612 through a gas supplying pipe 9 so that the pressure in the chamber 612 is higher than atmospheric pressure to prevent the entrance of atmospheric air. In other words, the two outlet chambers 61 and 62 in FIG. 1 are constructed as a single outlet chamber 612 and the cooling liquid from the outlet pipe 712 is recirculated in a similar fashion to the case of FIG. 1.

The device shown in FIG. 3 is capable of eliminating the above-described difficulties accompanying the device shown in FIG. 1 but it still suffers from the problem of cavitation. That is, the pressure in the outlet chamber 612 receiving the liquid from the opening 3a of the outflow pipe 3 is not as high as that in the case where it is filled with liquid and therefore the cooling liquid is freely discharged. As a result, cavitation occurs in the outflow paths 3b and 5c and in the cooling pipe for the rotor coil (not shown) thus leading to corrosion of these parts. In the device shown in FIG. 1, the outlet chamber 61 receiving the liquid from the outflow pipe 3 is maintained filled with liquid to prevent the occurrence of cavitation. Thus, it is considered essential to fill the outlet chamber with the liquid as in the device of FIG. 1 to avoid the above-described difficulty of cavitation.

SUMMARY OF THE INVENTION

In view of the foregoing, an object of the present invention is to provide a device for conducting cooling liquid out of a liquid cooled rotor type rotary electric machine with an outlet chamber which is not fully filled with cooling liquid discharged from the rotor to prevent the occurrence of cavitation in the discharging section of a cooling liquid supplying and draining pipe.

The foregoing object and other objects of the invention are achieved by the provision of a cooling liquid conducting device which has a cooling liquid containing member disposed surrounding the discharging section of the cooling liquid supplying and draining pipe and which is maintained fully filled with cooling liquid discharged through the discharging section. Discharging paths are provided between the supplying and draining pipe and the cooling liquid containing member itself. The centrifugal force acting on the cooling liquid discharged through the discharging paths as the supplying and draining pipe rotates is much smaller than that acting on the cooling liquid which is discharged directly from the discharging section of a supplying and draining pipe which is not provided with the cooling liquid containing member.

According to another aspect of the invention, paths for conducting out the cooling liquid are formed in the cooling liquid containing member to cause the cooling liquid passing through the conducting out paths to collide with cooling liquid discharged through the discharging paths thereby to decrease the force of the discharged cooling liquid against the inner walls of the outlet chamber.

Furthermore, according to the invention, limiting means such as thread seals for limiting the amount of cooling liquid discharged through the discharging paths are formed in the discharging paths to further decrease the force of the cooling liquid discharged against the inner walls of the outlet chamber.

The nature, principle and utility of the invention will become more apparent from the following detailed description and the appended claims when read in conjunction with the accompanying drawings.

BRIEF DESCRIPTION OF THE DRAWINGS

In the accompanying drawings:

FIG. 1 is a longitudinal sectional view showing a conventional cooling liquid conducting in and out device for a liquid cooled rotor type rotary electric machine;

FIG. 2 is a cross-sectional view taken along line II—II in FIG. 1;

DESCRIPTION OF THE PREFERRED EMBODIMENTS

Figure 3:
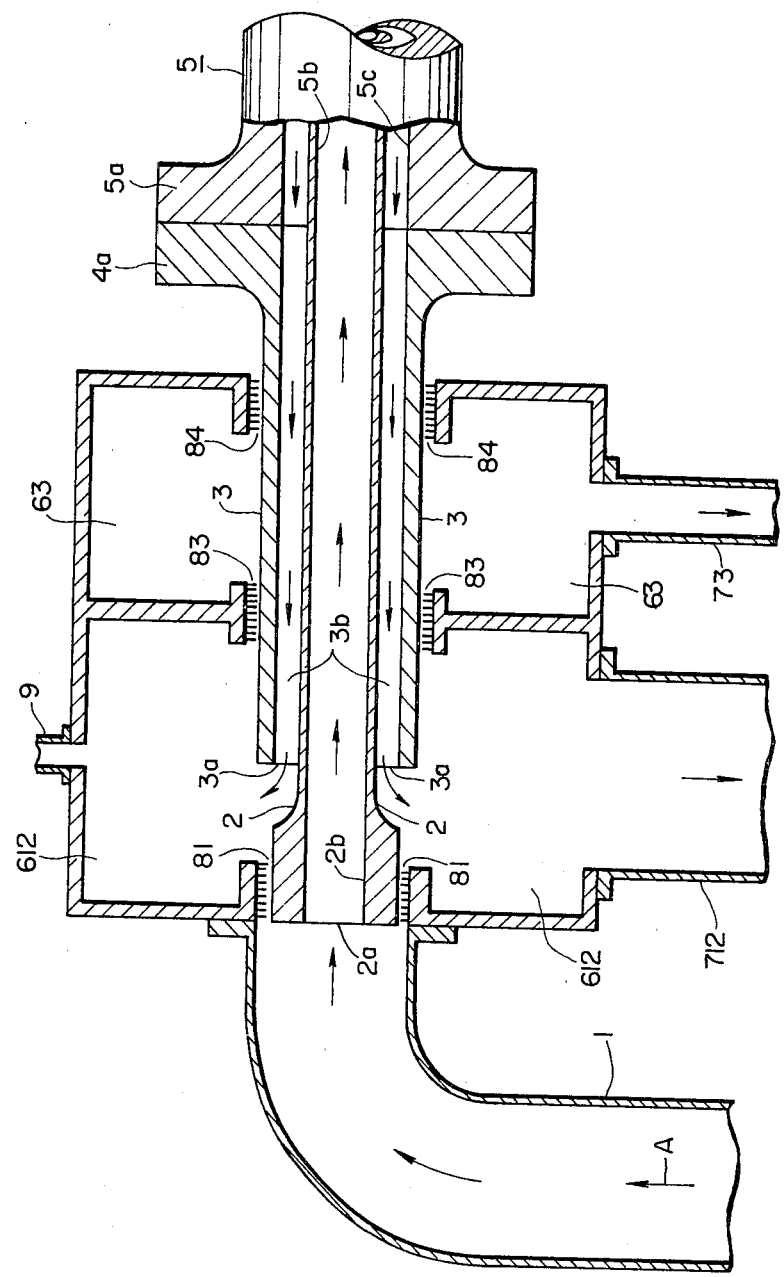
FIG. 3 is a longitudinal sectional view of a prior art cooling liquid conducting in and out device.
Figure 4:
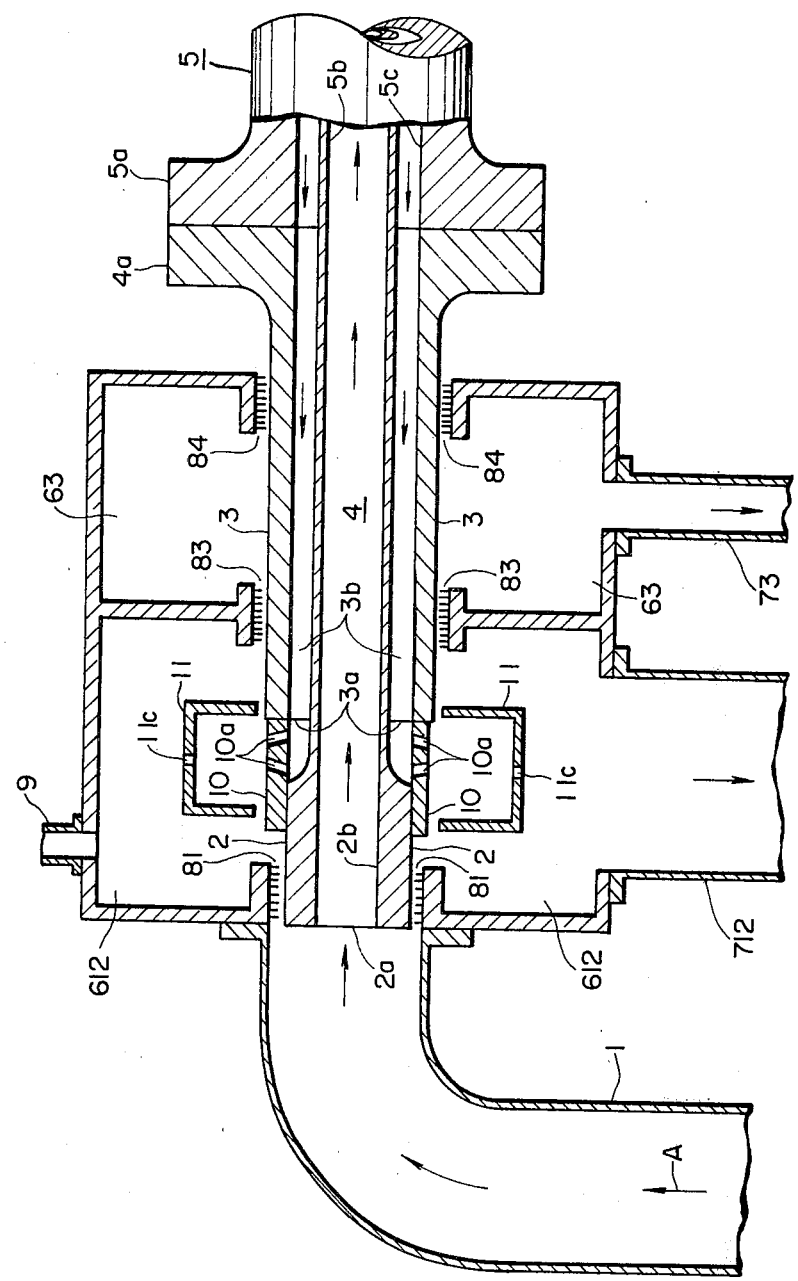
FIGS. 4 through 10 are longitudinal sectional views showing essential components of first through sixth embodiments of a device for conducting cooling liquid out of a liquid cooled rotor type rotary electric machine according to the invention.
Figure 5:
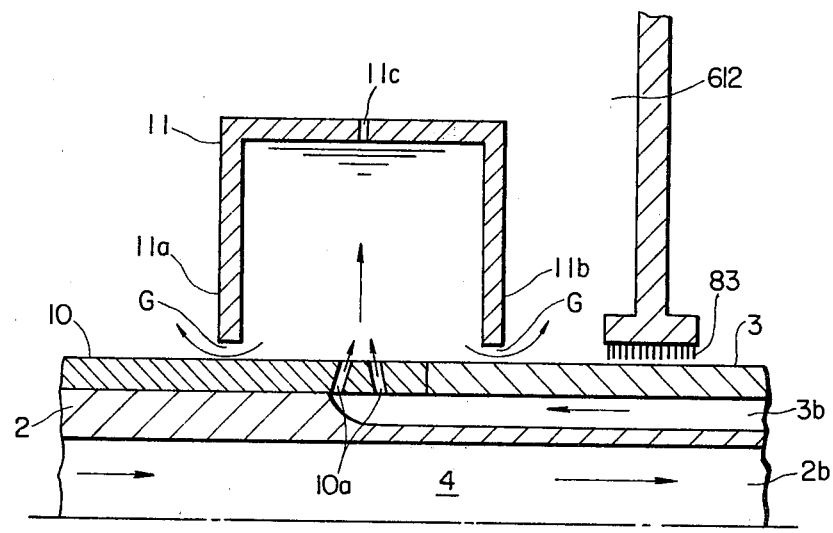

A first preferred embodiment of a device for conducting cooling liquid out of a liquid cooled rotor type rotary electric machine is shown in FIGS. 4 and 5. A discharging ring 10 with small holes 10a is provided. The discharge ring 10 is fixedly mounted on the inflow pipe, for instance, by shrink fitting, so that the small holes 10a confront the opening 3a of the outflow pipe 3. In this operation, the discharging ring 10 performs an orifice action, and therefore the problem of cavitation involved in the device shown in FIG. 3 can be completely solved. Because of the solution of the problem of cavitation, it is unnecessary to fill the outlet chamber 612 with the liquid, as a result of which the number of outlet chambers can be reduced to two and accordingly the length of the supplying and draining pipe 4 can be made shorter than that of the pipe 4 in FIG. 1 while the lateral vibration of the pipe 4 can be decreased accordingly. Furthermore, as the outlet chamber 612 is not fully filled with the liquid, the casing of the chamber 612 can be readily sealed and the power loss due to friction between the liquid and the pipe 4 as described above can be eliminated.

This device includes a liquid containing annular member 11 (hereinafter referred to merely as "an annular member 11" when applicable) which is disposed surrounding the small holes 10a of the discharging ring so as to be filled with cooling liquid discharged through the small holes 10a of the discharging ring 10, that is, through the cooling liquid discharging section of the cooling liquid supplying and draining pipe 4. Gaps G (FIGS. 5–10) are provided between the inner circumferential surface of one end 11a of the annular member 11 and the outer wall of the discharging ring 10, and the gaps G are also formed between the inner circumferential surface of the other end 11b of the annular member 11 and the outer wall of the outflow pipe 3. The gaps G form discharging paths communicating with the outlet chamber 612. The cooling solution filling the annular member 11 is fully discharged into the outlet chamber 612 through the discharging paths or gaps G. The annular member 11 has a small hole 11c provided to remove bubbles.

As is apparent from the above description, in the first embodiment of the device according to the invention, cooling liquid discharged through the small holes 10a of the discharging ring 10, after filling the annular member 11 fully, is discharged therefrom into the outlet chamber 612 through the discharging paths, namely, the gaps G between the annular member 11 and the discharging ring 10 and the outflow pipe 3.

In this device, the cooling liquid discharging speed can be reduced to an extremely small value by properly selecting the size of the gaps G. A centrifugal force generated by rotation of the supplying and draining pipe 4 acts on the cooling liquid discharged through the discharging paths as a result of which the cooling liquid is scattered towards the inner walls of the outlet chamber 612. However, by suitably selecting the size of the gaps, the collision force on the inner walls of the outlet chamber 612 can be made quite small, and sound which is generated when the discharged cooling liquid collides with the inner walls also made quite small. Furthermore, the sealing condition of the outlet chamber is maintained unchanged and corrosion of the inner walls is prevented. In addition, it should be noted that the size of the gaps G is determined by taking the axial vibration of the supplying and draining pipe 4 into account so that the annular member 11 is maintained filled with the cooling liquid.

In the above-described embodiment, the small holes 10a of the discharging ring 10 are arranged in two lines in a circumferential direction although they may be arranged in a single line or in three or more lines as desired. Furthermore, in the above-described embodiment, the discharging ring 10 is described as being fixedly mounted on the inflow pipe 2 by shrink fitting although it may be mounted thereon by other techniques or it may be fixedly mounted on the overflow pipe 3. In addition, in the above-described embodiment, the discharging ring 10 and the outflow pipe 3 are manufactured separately. However, they may be manufactured as one unit.

Figure 6:
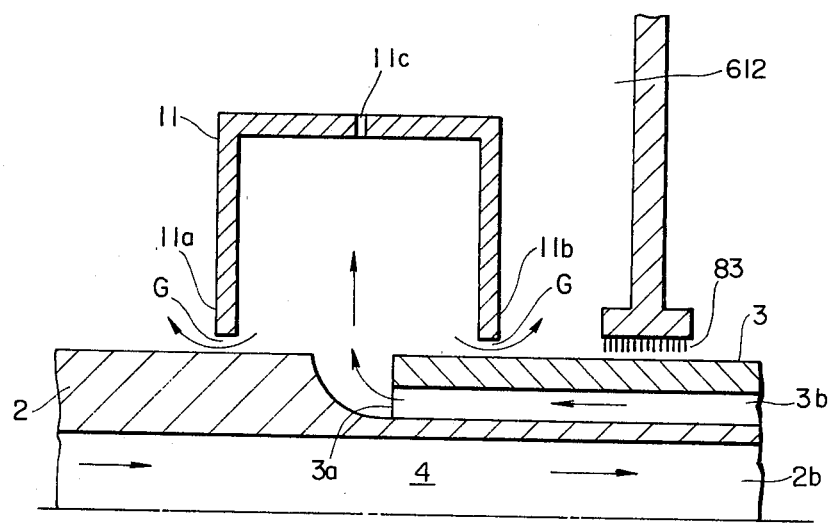

According to the invention, the annular member 11 is maintained filled with cooling solution discharged through the small holes 10a of the discharging ring 10. This allows the annular member 11 to prevent the occurrence of cavitation. Accordingly, the size of the drainage opening of the pipe 4 can be increased. As the size of opening is increased, the velocity of the cooling liquid passing through the draining opening is decreased which contributes to the prevention of corrosion of the drainage opening. As the annular member 11 has the effect of preventing cavitation as described above, the device may be so designed that, as shown in FIG. 6, the cooling liquid from the outflow path 3b of the outflow pipe 3 runs into the annular member 11 through the opening 3a of the outflow pipe 3 without providing the discharging ring 10. This is a second embodiment of the device according to the invention which has the same advantageous effects as the first embodiment described above. However, it should be noted that it is necessary to set the size of the gaps G to a value such that the pressure in the annular member 11 causes no cavitation. In the above-described first and second embodiments, the cooling liquid containing member 11 is annularly shaped although it may be polygonal.

Figure 7:
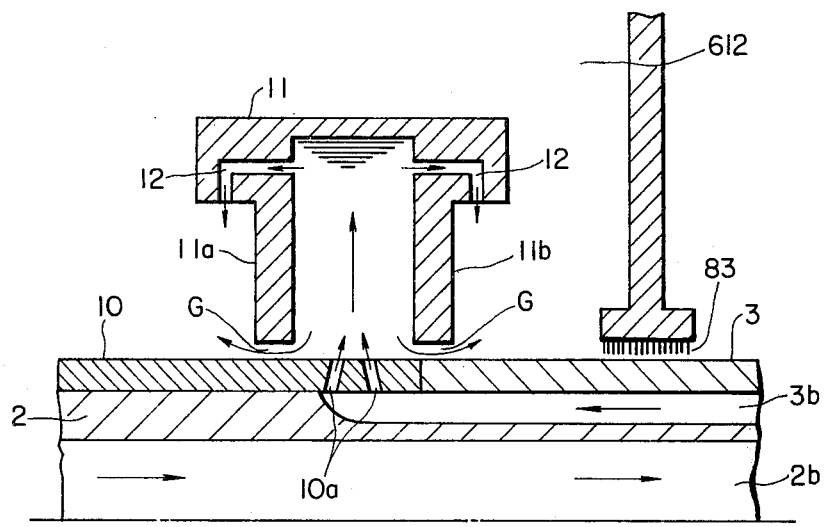

A third embodiment of a device according to the invention is shown in FIG. 7 in which the force of the cooling liquid discharged through the gaps G is reduced so that the force of the cooling liquid striking against the inner walls of the outlet chamber is further decreased. FIG. 7 is an enlarged view showing essential components of the cooling liquid discharging section. As shown in FIG. 7, conducting out passages 12 are formed in the cooling liquid containing member 11. The cooling liquid filling in the containing member 11 is conducted out, for instance, towards the cooling liquid supplying and draining pipe 4 through the conducting out passages 12. A plurality of conducting out passages 12 may be formed radially in the containing member 11.

The containing member 11 is filled with cooling liquid discharged through the small holes 10a of the discharging ring 10. A part of the cooling liquid in the containing member 11 is discharged through the gaps G, that is, the discharging paths, into the outlet chamber 612. The velocity of cooling liquid thus discharged can be reduced to an extremely small value by adjusting the size of the gaps G or the conducting out passages 12. The cooling liquid discharged through the discharging paths is scattered towards the inner walls of the outlet chamber 612 by a centrifugal force generated by rotation of the cooling liquid supplying and draining pipe 4. However, the cooling liquid thus scattered collides with cooling liquid which is conducted into the outlet chamber 612 through the conducting out passages 12 so that striking of the cooling liquid against the inner walls of the outlet chamer 612 is prevented. Accordingly, sound which may be caused if the cooling were to strike directly against the inner walls of the outlet chamber 612 is greatly reduced. Especially, the collision of the discharged cooling liquid with the outlet chamber 612 is substantially prevented. Furthermore, the sealing condition of the outlet chamber 612 is maintained unchanged and corrosion of the inner walls of the outlet chamber 612 is prevented. It should be noted that the dimensions, configuration and number of the conducting out passages 12 are so designed that the cooling liquid containing member 11 is fully filled with the cooling liquid.

Figure 8:
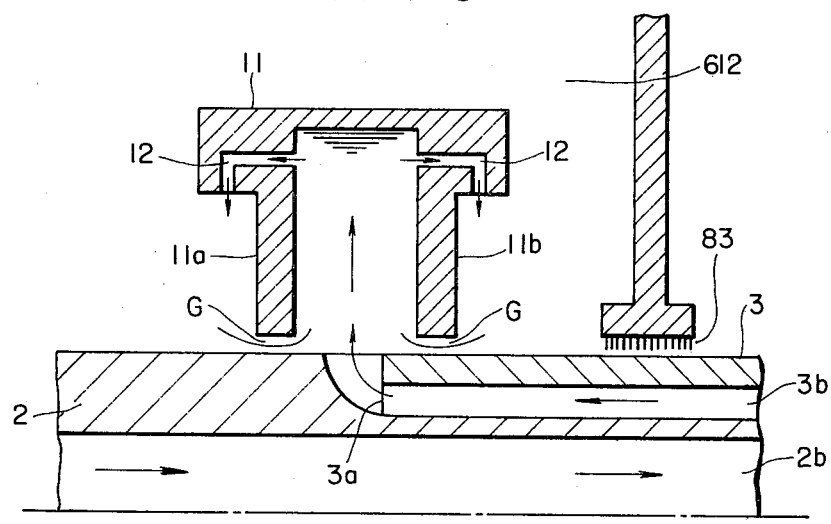

The containing member 11 has the effect of preventing cavitation as described above. The device shown in FIG. 7 may be modified as shown in FIG. 8 in which the cooling liquid from the outflow path 3b of the outflow pipe 3 is discharged through the opening 3a of the outflow pipe 3 into the cooling liquid containing member 11 without providing the discharging ring 10 (FIG. 7). This is a fourth embodiment of a device according to the invention. The fourth embodiment has the same advantages as the third embodiment shown in FIG. 7. However, it should be noted that it is necessary to determine the dimension, configuration and number of the conducting out paths 12 so that the pressure in the cooling liquid containing member results in no cavitation.

In the above-described third and fourth embodiments, a plurality of conducting out passages 12 are formed radially in the containing member 11 although the arrangement of conducting out passages 12 can be varied to provide the best results depending on the application.

The leakage of cooling liquid through the above-described gaps G can be minimized by providing a seal on the outer wall of the cooling liquid supplying and draining pipe 4 at positions corresponding to the positions of the gaps G in such a manner as to provide a pumping effect utilizing the rotation of the pipe 4. In such a construction, the cooling liquid which tends to leak through the gaps G is pushed back into the cooling liquid containing member 11 by the pumping effect as a result of which the amount of cooling liquid leaking through the gaps G is reduced.

Figure 9:
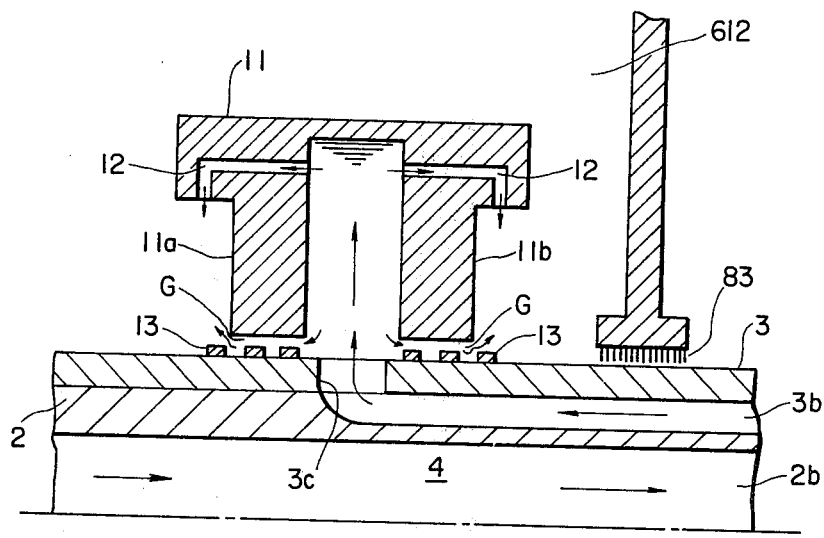

This effect will be described with reference to FIG. 9 which shows a fifth embodiment of the device according to the invention. FIG. 9 is an enlarged view showing essential components of the cooling liquid discharging section. As is apparent from FIG. 9, no discharging ring is employed but the outflow pipe 4 is extended to the position of the discharging ring and a discharging hole 3c corresponding to the small holes 10a of the discharging ring 10 is formed in the outflow pipe 4. That is, the discharging ring 10 can be eliminated by constructing the outflow pipe 4 as described above.

Limiting members 13 are formed on the outer wall of the outflow pipe 3 protruding into the discharging paths, the gaps G, to limit the amount of cooling liquid passing through the gaps G. In FIG. 9, the limiting members 13 are thread seals formed on the outer wall of the outflow pipe 3.

The cooling liquid containing member 11 is fully filled with cooling liquid discharged through the discharging hole 3c of the outflow pipe 3 and a part of the cooling liquid in the containing member passes through the discharging paths, the gaps G, into the outlet chamber 612. However, the velocity of the cooling liquid is extremely low because the amount of cooling liquid passing through the gaps G is limited by the thread seals 13. Accordingly, sound which may be generated if cooling liquid were to strike directly against the inner wall of the outlet chamber 621 is greatly decreased. Especially, sound which is generated when the cooling liquid strikes against the wall of the outlet chamber 612 is substantially completely eliminated. Furthermore, in this case also, the sealing condition of the outlet chamber is maintained unchanged and corrosion of the outlet chamber 612 is prevented.

It should be noted that the directions of the thread seals 13 are such that the cooling liquid tending to run through the gaps G into the outlet chamber 612 is pushed back into the cooling liquid containing member 11.

The discharging hole 3c of the outflow pipe 3 in FIG. 9 is larger in size than the small holes 10a of the discharging ring 10 due to the following reason. As the containing member 11 is filled with cooling liquid discharged through the discharging hole 3c of the outflow pipe 3, the containing member 11 will prevent cavitation by correctly presetting the dimensions, configuration and number of the conducting out paths 12 as described before. Accordingly, it is not always necessary to make the size of the discharging hole 3c of the outflow pipe 3 small. As the discharging holes 3c are large in size, the velocity of cooling liquid passing through the discharging hole 3c is relatively low which contributes to the prevention of the corrosion of the discharging hole 3c.

In the above-described fifth embodiment, one relatively large discharging hole 3c is formed in the outflow pipe 3 although a plurality of relatively small discharging holes 3c may be used instead.

Figure 10:
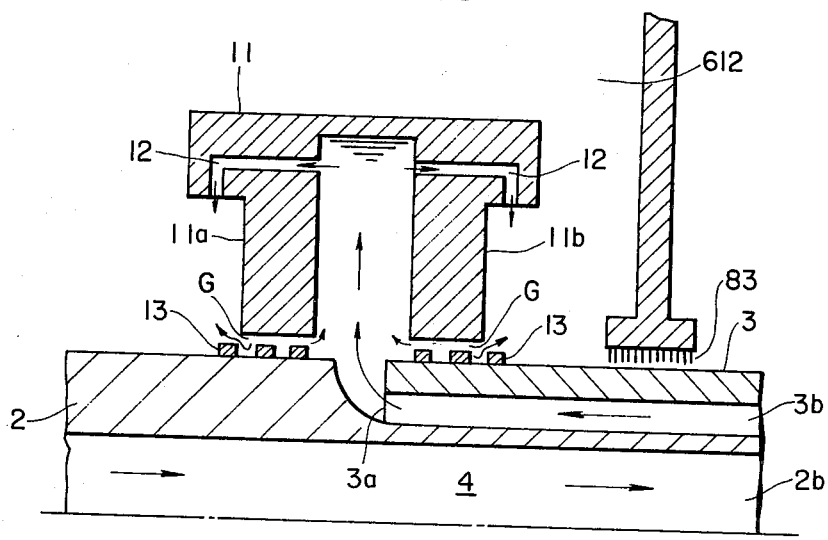

As is clear from the above description, the device shown in FIG. 9 may be modified so that the cooling liquid passing through the outflow passage 3b of the outflow pipe 3 is discharged into the cooling liquid containing member 11 from the opening 3a of the outflow pipe 3 as shown in FIG. 10. This is a sixth embodiment of a device according to the invention. In the sixth embodiment, the same advantageous effects as for the fifth can be obtained. However, it should be noted that, in this case also, it is necessary to determine the dimension, configuration and number of the conducting out passages 12 so that the pressure in the cooling liquid containing member 11 causes no cavitation.

In the above-described fifth embodiment, thread seals are formed on the cooling liquid supplying and draining pipe 4, that is, the outflow pipe 3 which in the sixth embodiment thread seals are formed on both the outflow pipe 3 and the inflow pipe 2. Also, thread seals may be formed on the cooling liquid containing member 11. In the fifth and sixth embodiments, thread seals are employed as the limiting members 13 although labyrinth seals may be employed if desired.

What is claimed is:

1. A device for conducting cooling fluid out of a liquid cooled rotary machine in which a cooling liquid circulating in the rotor of said rotary machine for cooling said machine is discharged through a discharging section of a cooling liquid supplying and draining pipe comprising:

an outlet chamber having an outlet passage;

means for maintaining a pressure in said outlet chamber higher than atmospheric pressure by a shielding gas; and a cooling liquid containing member surrounding said discharging section, said cooling liquid containing member being arranged between said discharging section and said outlet passage, said cooling liquid containing member being fully filled with said cooling liquid discharged through said discharging section, discharging paths being formed between said cooling liquid containing member and said cooling liquid supplying and draining pipe which communicate with said outlet chamber.

2. The device as claimed in claim 1 in which said cooling liquid containing member is annularly shaped.

3. The device as claimed in claim 1 in which said cooling liquid containing member is polygonally shaped.

4. The device as claimed in claim 1 wherein conducting out passages are formed in said cooling liquid containing member for conducting said cooling liquid which fills said cooling liquid containing member out of said cooling liquid containing member.

5. The device as claimed in claim 4 in which said conducting out passages are so shaped that cooling liquid passing through said conducting out paths is discharged towards said cooling liquid supplying and draining pipe.

6. The device as claimed in claim 5 wherein said conducting out passages are so shaped that cooling liquid passing through said conducting out paths collides with cooling liquid being discharged from said cooling liquid containing member through said discharging paths.

7. The device as claimed in claim 4, 5 or 6 further comprising: limiting means provided in said discharging paths for limiting an amount of cooling liquid discharged through said discharging paths.

8. The device as claimed in claim 7 wherein said limiting means comprises labyrinth seals.

9. The device as claimed in claim 7 in which said limiting means comprises thread seals.

10. The device as claimed in claim 9 in which said thread seals are provided on said cooling liquid supplying and draining pipe.

11. The device as claimed in claim 9 in which said thread seals are provided on said cooling liquid containing member.

12. The device as claimed in claim 1 wherein said cooling liquid containing member has at least one small hole formed therein to remove bubbles formed in said cooling liquid containing member.

13. The device as claimed in any one of claims 1-5, or 6 or 12, further comprising a discharge ring surrounding said discharging section, said discharging ring being located between said discharging section and said cooling liquid containing member and having at least one hole formed therein for providing a communication between said discharge section and said cooling liquid containing member.

14. The device as claimed in claim 13 wherein said discharge ring has a plurality of holes therein, said plurality of holes being arranged in a line in a circumferential direction of said discharge ring.

15. The device as claimed in claim 14 wherein said plurality of holes of said discharge ring are arranged in a plurality of lines in a circumferential direction of said discharge ring.

* * * * *